UNITED STATES PATENT OFFICE.

FRITZ TIEMANN, OF BERLIN, GERMANY.

PROCESS FOR PURIFYING AND DECOLORIZING SUGAR SOLUTIONS.

1,101,156. Specification of Letters Patent. Patented June 23, 1914.

No Drawing. Application filed April 15, 1913. Serial No. 761,270.

*To all whom it may concern:*

Be it known that I, FRITZ TIEMANN, a subject of the German Emperor, residing at No. 259 Kurfürstendamm, Berlin, Germany, have invented certain new and useful Improvements in Processes for Purifying and Decolorizing Sugar Solutions; and I do hereby declare the following to be a full, clear, and exact description of the invention, such as will enable others skilled in the art to which it appertains to make and use the same.

My invention refers to a process for purifying and decolorizing sugar solutions.

Many processes for purifying and decolorizing liquids have been tried using materials of very different kinds. But all known processes hitherto were not really successful. For instance it has been suggested to use tannates, silicic acid and hydrates of the alkaline earths or metals for decolorizing and purifying of the solutions of sugar in all phases of manufacture. But excepting the use of the compounds of calcium almost all means hitherto proposed were not successful in the industry. On the one hand the reactions proceed too violently so that not only the impurities are removed but also the material to be purified is injured. On the other hand it is impossible to remove the precipitates by filtration from the juices owing to their colloidal nature. I have now invented a process overcoming certain of these drawbacks.

The process has the following foundation. It is known in the dyer's art that textile fibers do not absorb coloring matters directly or at least do not fix them. Therefore it is necessary to fix on the fibers certain substances, so called mordants, forming insoluble lacs. By this means reagents are insolubly fixed in the textile fibers which are not removable by mechanical means as for instance oxyhydrates of alumina, of baryta, of lead, of iron and so on. In certain instances the lower hydroxids may also be so precipitated. It is further known that other substances, soluble in water, can be fixed on cotton fibers without difficulty so as to become insoluble, as for instance most of the tannic and oleic compounds. Finally it is known that all these substances mordanted on to the textile fiber preserve all their original chemical qualities and therefore retain all their characteristic chemical reactions and that these relations pass off even in a more approximately quantitative manner owing to the fine molecular distribution in the textile fiber.

All reactions take place in the textile fiber itself and are not disturbed by other influences. Hence by using several reagents fixed on different textile fibers the different reactions remain independent of each other, even if the different operations take place simultaneously or one after another in the same apparatus and the same solutions. Therefore it is also possible to remove without any difficulty the precipitates which exist only in the fiber. I take advantage of these circumstances in purifying and decolorizing liquids by bringing the solutions to be purified into contact with kieselguhr, bone black or similar materials on which reagents are fixed in a manner capable of precipitating and fixing the impurities. As such reagents I use especially metal salts, especially tin salts for instance tin oxalate or tin fluorid.

The action of the kieselguhr, bone black or similar materials covered with one or different reagents may take place in one or several stages and in any stage of the manufacture, as long as the sugar products are in a fluid state or are redissolved as in refineries. I may stir the purifying agents on which the mordants are fixed with the liquid or I may filter the sugar solution through a layer of the purifying agents. I may also proceed in such manner that I introduce into the solution simultaneously kieselguhr, bone black or similar materials and a solution of the above mentioned metal salts, whereby the metal salts are fixed on the solid materials and the solution is purified.

To illustrate the manner in which I reduce my invention to practice I shall proceed to describe an example of my new process as applied to a refining solution. Cane-sugar is dissolved at a temperature of 40 to 50° C. It has admixtures of gum and coloring matter. For purifying, I first mordant kieselguhr, bone black or similar material with metal salts such as are used as mordant in dyeing cotton fix the metal hydroxid on the material, wash out soluble salts and bring the solution into contact with the material. By the influence of the metal salts on the impurities heavy precipitates are immediately formed which are fixed on the kieselghur or bone black, and removed therewith from the solution. I may also fix on the kieselguhr or bone black or similar material, several purifying mordants, for example I may fix thereon a reagent, in the form of a mordant, capable of removing the gum, and thereafter I may mordant thereon a separate reagent, capable of combining with the coloring matters, to produce insoluble compounds.

As an example of a preferred mode of fixing the mordant to the kieselguhr or other material, the following is given, in which tin hydroxid is the particular mordant to be fixed on the kieselguhr: the kieselguhr is treated with an aqueous solution of stannic chlorid. In weak solutions, as is well known, stannic chlorid is dissociated producing stannic oxyhydrate, and in this instance the same will be formed in the capillaries of the kieselguhr, as a colloidal precipitate, while hydrochloric acid is produced in the solution.

In order to complete the precipitation, the hydrochloric acid is slowly neutralized by the addition of milk of lime, or better still soda, the solution being more or less agitated all the while, after which the kieselguhr carrying the precipitate is washed with water, in order to remove the calcium chlorid or sodum chlorid therefrom. Stannic hydroxid as is well known, is itself so fine as to prevent removal from liquids by filtration, while in this case it is mordanted upon the kieselguhr and is thereby held, during the filtration and washing, so that substantially the entire amount remains attached to the kieselguhr. This material may be added to a sugar solution containing coloring matter, said solution being at about 63° Brix, and at 40 to 45° C., in order to completely clarify and decolorize said sugar solution.

I claim:—

1. A process for purifying and decolorizing solutions especially solutions of sugar which process comprises bringing into contact the solutions to be purified with a porous solid material, on which mordants are fixed.

2. A process for purifying and decolorizing solutions especially solutions of sugar, which process comprises bringing into contact the solutions to be purified with a porous material, on which several different mordants are fixed.

3. A process for purifying and decolorizing solutions especially solutions of sugar which process comprises bringing into contact the solutions to be purified with a porous material, carrying a mordant consisting of a metal-hydrogen-oxygen compound.

4. A process of purifying and decolorizing solutions of sugar and the like, which comprises treating said solutions with a porous solid material, carrying a mordant.

5. A process of purifying and decolorizing solutions of sugar and the like, which comprises subjecting said solutions to the action of kieselguhr carrying a mordant.

6. A process of removing the color from solutions of sugar and the like, which comprises treating said solutions with a solid porous material, carrying rigidly attached thereto, an insoluble material capable of reacting with the coloring material of said solution to produce an insoluble solid substance.

In testimony whereof I have affixed my signature, in presence of two witnesses.

FRITZ TIEMANN.

Witnesses:
HENRY HASPER,
WOLDEMAR HAUPT.